Feb. 27, 1968  W. R. VIGNINI  3,370,989
HARD SEAL FOR CELL TERMINALS
Filed Oct. 8, 1965  2 Sheets-Sheet 1
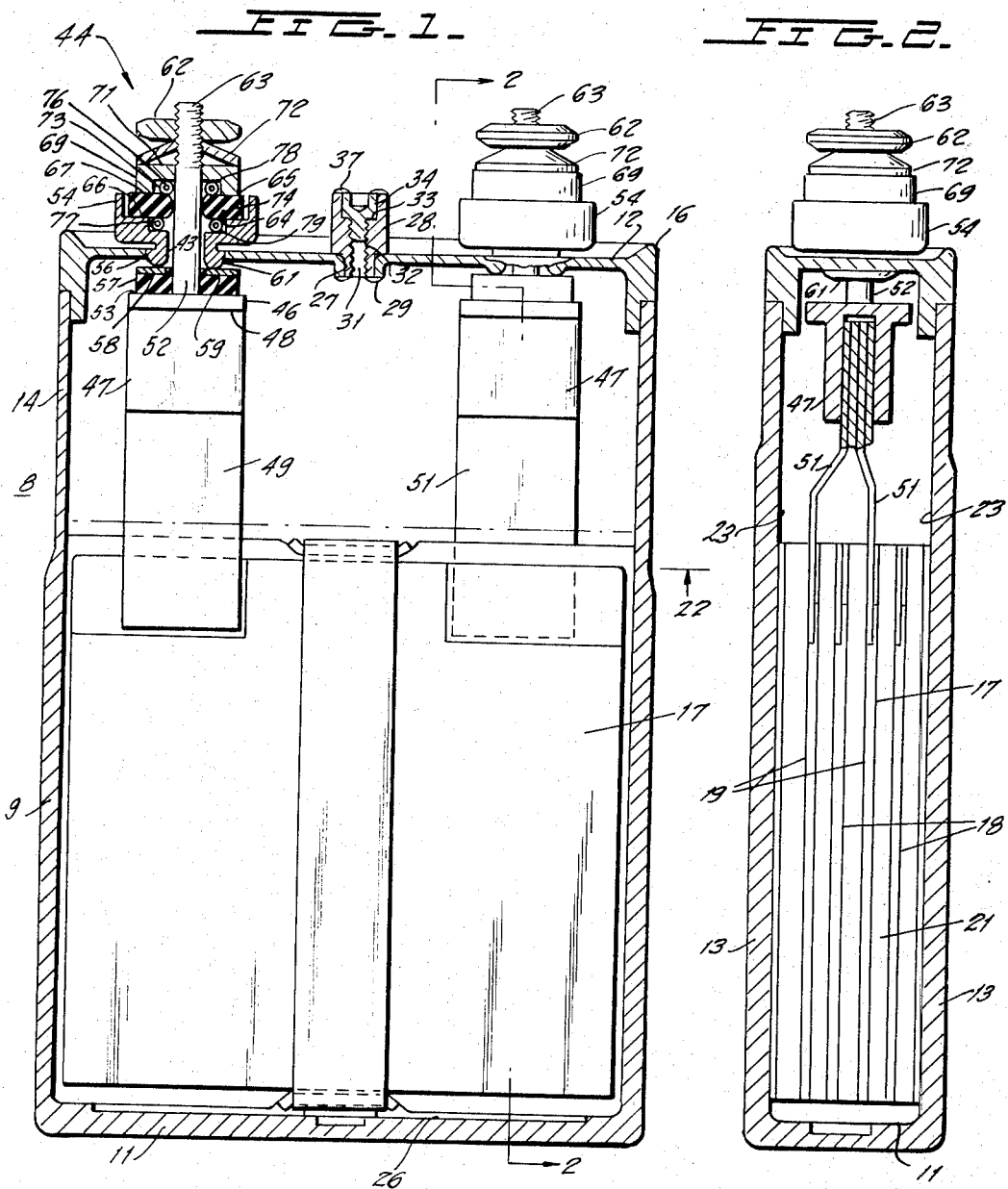
INVENTOR.
WALTER R. VIGNINI
BY
OSTROLENK, FABER, GERB & SOFFEN
ATTORNEYS Feb. 27, 1968    W. R. VIGNINI    3,370,989
HARD SEAL FOR CELL TERMINALS
Filed Oct. 8, 1965    2 Sheets-Sheet 2

INVENTOR.
WALTER R. VIGNINI
BY
OSTROLENK, FABER, GERB & SOFFEN
ATTORNEYS

United States Patent Office 3,370,989
Patented Feb. 27, 1968

3,370,989
HARD SEAL FOR CELL TERMINALS
Walter R. Vignini, Peekskill, N.Y., assignor to Sonotone Corporation, Elmsford, N.Y., a corporation of New York
Filed Oct. 8, 1965, Ser. No. 494,039
9 Claims. (Cl. 136—168)

ABSTRACT OF THE DISCLOSURE

A terminal seal for a battery cell is described, which utilizes a pair of metallic rings clamped between the metallic surfaces of the terminal shank and casing aperture with an intermediate insulative member between the metallic sealing rings.

---

This invention relates to electric battery cells and, more particularly, to hermetically sealed battery cells operating with an alkaline electrolyte.

One common type of electric battery cell operates with a liquid alkaline electrolyte that fills the space between oppositely poled electrodes enclosed in the battery casing. Such cells employ one or more metallic terminal members that extend through apertured portions in the battery casing wall for providing external access to the interior electrodes. In such cells the corrosive alkaline electrolyte tends to creep, by capillary action or otherwise, along any crevices from the interior to the exterior surfaces of the battery cell; this phenomenon is particularly pronounced at the interface between the extending portion of the metallic terminal member and the adjacent aperture periphery. A casing seal is generally provided at such interface in an attempt to prevent escape of the electrolyte. Unfortunately, the seals employed in prior designs have had only limited effectiveness in suppressing such leakage. In many cases the resulting corrosion has led to extensive damage and deterioration of the cell.

In typical prior art arrangements wherein a metallic terminal member is held insulatingly sealed from a metallic casing wall through which it passes, the seal employed is an elastomeric or hard plastic bushing. The bushing is held compressed between an internal seating head of the terminal member and the casing by a sealing nut engaging a threaded shank portion of such member. The hermetic seal provided by such a bushing is mechanically disadvantageous, in several ways. In the first place, an elastomeric bushing of this type tends to cold-flow under compression, thereby impairing the effectiveness of the seal. In addition, a hard plastic bushing of this type must generally be fusion joined, as by an adhesive, to the adjacent casing wall and terminal member surfaces. In addition, the seal provided by both types of bushings is impaired by exposure to radiation, such as is common when the resulting sealed cell is used in outer space applications, such as to power artificial satellites and the like.

One object of the invention, therefore, is to provide an improved hermetic sealing arrangement between a battery casing wall and a separate metallic terminal member extending through an opening in the casing wall.

Another object of the invention is to provide a radiation-resistant, leak-proof insulating seal between an apertured metallic battery casing wall and a metallic terminal member extending therethrough, without the use of fusion joints and without susceptibility to cold flow.

These objects are attained by sealing arrangements in accordance with the instant invention, in which a pair of metallic ring type members are insulatingly retained and compressed against adjacent metallic surfaces of the battery casing wall and the terminal member, respectively. The "hard" seals provided by the metallic rings may be formed by compressing the rings between spaced portions of an insulating collar member and the adjacent metallic surfaces through the application of a clamping force between the sealing nut and the interior seating head of the metallic terminal member. The metallic rings preferably have a uniform hollow cross-section defined by a closed peripheral surface of predetermined geometrical shape.

The nature of the invention and its various advantages and features are set forth more fully in the following detailed description taken in conjunction with the drawing, in which:

FIG. 1 is a sectional front elevation, partly in diagrammatic form, of a sealed alkaline battery cell employing one form of sealing arrangement in accordance with the invention;

FIG. 2 is a sectional side elevation taken along line 2—2 of FIG. 1;

FIG. 3 is a top view of the battery of FIG. 1;

Figure 5:
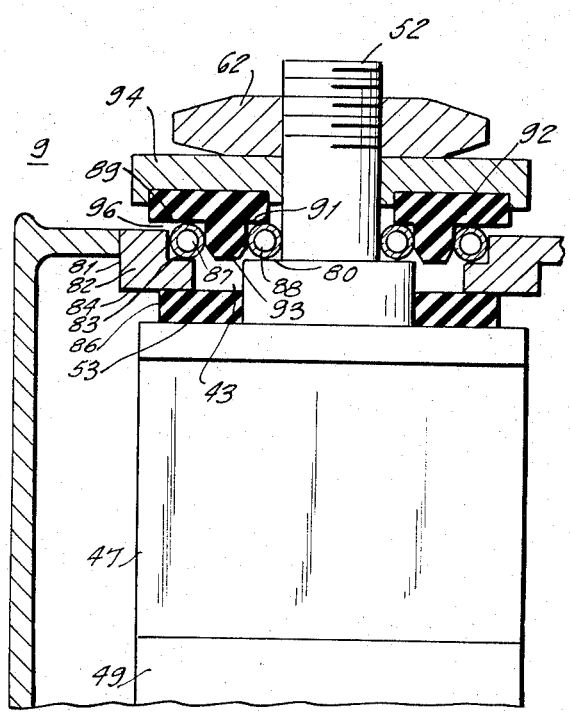
FIG. 5 is an enlarged detail view of a modified form of sealing arrangement in accordance with the invention.
Figure 4A:
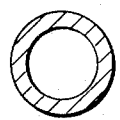
FIGS. 4A–4D are enlarged cross-sectional views of several forms of metallic ring members suitable for use in the arrangement of FIGS. 1–3.
Figure 4B:
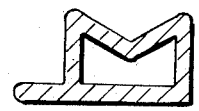
Figure 4C:
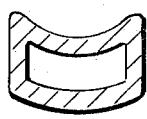
Figure 4D:
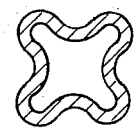

The principles underlying the features of the invention will be explained by reference to a first embodiment thereof in the form of a rechargeable battery cell 8 shown in FIGS. 1–3. The battery cell 8 comprises a metallic casing 9 having an integral bottom wall 11 and an apertured top wall 12. The walls 11 and 12 are separated by a pair of opposed wide side walls 13—13 and an adjoining pair of opposed narrow side walls 14—14. The top wall 12 is provided with a generally rectangular border portion 16 hermetically joined, as by brazing or welding, to the surrounding top ends of the battery casing walls 13—13 and 14—14. The casing 9 is formed of an alkali resistant material such as cold rolled sheet steel.

Mounted within the casing 9 is an electrode assembly 17, which illustratively comprises a stack of spaced vertical electrode plates 18 and 19 of alternating polarity. Each adjacent pair of opposite polarity plates 18 and 19 is separated by an electrically insulating separator sheet or layer 21. The electrode assembly 17 is permeated by, and is held immersed within, a liquid body of an alkaline electrolyte to a level which is higher than an upper surface 22 of the electrode assembly 17. Where the battery 8 is in the form of a nickel-cadmium cell, the electrolyte usually consists of a 20 to 35 percent (by weight) solution of potassium hydroxide in water.

The top wall 12 of the casing 9 is provided with a centrally disposed filling aperture 27, through which the electrolyte may be added. Filler tube 28 is welded to cover 12 at 29, and includes a central opening passage 31 having a tapped portion 32 and a shouldered portion 33 for threadedly receiving and seating sealing screw 34. Sealing screw 34 is welded at 37 to the top of filling tube 28 during final assembly, thereby sealing the central passage through filling tube 28. Alternatively, such sealing of the filling tube may be provided by a pinching and welding technique, as is well known in the art.

In the particular form of battery assembly shown which incorpates my invention, the top wall 12 is provided with a pair of terminal apertures 43—43 disposed on opposite sides of the central vent aperture 27. Should, however, case 13 be at the negative potential, only one such insulated terminal member is required. A pair of elongated, substantially identical metallic terminal members 44—44 extend through the respective terminal apertures 43—43 for providing terminal connections to the opposite polarity electrode plates 18 and 19 of the electrode assembly 17. The terminal members 44—44 are advantageously made of an alkaline resistant material such as nickel coated steel. Each metallic terminal member 44 comprises an internal seating head 46 dimensioned to captivate the terminal member 44 within the cell casing 9. A downwardly extending ear member 47 is integrally affixed, as by welding, to a bottom surface 48 of the seating head 46.

The ear member 47 associated with one of the terminal members 44 is connected to an array of strip-like electrode tabs 49, which are affixed to the positive electrodes 18 of the electrode assembly 17. The ear member 47 associated with the other of the terminal members 44 is connected to a similar array of electrode tabs 51, which are affixed to the negative electrodes 19 of the electrode assembly 17.

Each terminal member 44 is also provided with an elongated shank 52 extending vertically from a top surface 53 of the seating head 46 in an upward direction through the associated terminal aperture 43 to the exterior of the cell casing 9.

A first metallic retaining collar 54, preferably of stainless steel, is disposed around the shank 52 of the terminal member 44. An outer circumferential surface 56 of the collar 54 is conductively fused, as by weld 61, to the periphery of the terminal aperture 43. A first insulating collar 57 is disposed around the lower portion of the shank 52 in engagement with the top surface 53 of the seating head 46. A metallic washer 58 is seated within an upper recess 59 of the first insulating collar 57. The washer 58 engages a portion integral with the conductive junction of the top wall 12 and the outer circumferential surface 56 (such as weld region 61), when a vertical compression force is applied to the terminal member 44. Such compression or clamping force is applied by tightening a sealing nut 62, which engages an upper threaded portion 63 of the shank 52 on the exterior side of the terminal aperture 43. As shown, the shank 52 is held immobilized under the clamping force when the washer 58 engages the portion 61.

A bottom surface 64 of a second insulating collar 65 is received within a top recessed portion 66 of the first metallic retaining collar 54. A top surface 67 of the collar 65 is engaged by an outer surface 68 of a second metallic retaining collar 69. The sealing nut 62 is disposed in overlying relationship to an opposite outer surface 71 of the second metallic retaining collar 69. The tightened sealing nut 62 engages the surface 71, applying clamping force to the terminal member 44. An intermediate stainless steel spring washer 72, of the type commercially known as a Belleville washer, may be included.

The material forming the first and second insulating collars 57 and 65 may be chosen from many alkali-resistant, radiation resistant, and gas-tight materials, such as a suitable cerable or glass.

In accordance with the invention, a pair of hollow metallic sealing rings 73 and 74 surrounding the shank 52 are compressed by the clamping force applied to the shank 52 between the tightened sealing nut 62 and the top surface 53 of the seating head 46 to form hermetic seals for the battery 8. The metallic rings 73 and 74 are preferably formed of gold-plated stainless steel and respectively having uniform hollow cross-sections defined by a pair of closed peripheral surfaces 76 and 77. While the cross-sectional shapes of the rings 73 and 74 are generally arbitrary, they may advantageously define configurations similar to the letters "O" "Z" "K" or "X" as respectively shown in FIGS. 4A–4D.

Referring again to FIG. 1, the metallic ring 73 is held compressed between a bottom recessed portion 78 of the second metallic collar 69 and the top surface 67 of the insulating collar 65. In this manner, the compressed ring 73 bears against the adjacent portion of the shank 52. This arrangement prevents the escape of electrolyte along the junction surfaces between the second retaining collar 69 and the adjacent portions of the shank 52 and the second insulating collar 65. Similarly, the metallic ring 74 is held compressed between a bottom recessed section 79 of the first retaining collar 54 and the bottom surface 64 of the second insulating collar 65. The escape of electrolyte along the junction surfaces between the insulating collar 65 and the adjacent portions of the first retaining collar 54 is thereby prevented.

A modified form of sealing arrangements in accordance with the invention is shown in FIG. 5. In this embodiment, the terminal member 44 is additionally provided with an intermediate stepped horizontal surface 80. An outer circumferential surface 81 of a metallic retaining member 82, which has a generally L-shaped cross-section, is fused (as by welding) to the periphery of the terminal aperture 43 in the top wall 12. The retaining member 82 is provided with a top recessed surface 83 that is substantially aligned with the stepped horizontal surface 80 of the terminal member 44. The top surface 53 of the seating head 46 is spaced from a bottom surface 84 of the retaining member 82 by an insulating spacer 86. A pair of concentric metallic rings 87 and 88, which are of the general construction and shape described above, are compressed between a pair of spaced, horizontally aligned surfaces 89 and 91, respectively, of an overlying insulating collar 92, and the horizontally aligned surfaces 80 and 83. The surfaces 89 and 91 are separated by a downwardly projecting portion 93 of the insulating collar 92, which is immobilized by an overlying retainer 94 against which the sealing nut 62 bears. The compressed outer metallic ring 87 prevents leakage of electrolyte through a gap 96 formed between adjacent non-contacting surfaces of the retaining member 82 and the insulating collar 92. Similarly, the compressed inner metallic ring 88, which engages the adjacent surface of the shank 52, substantially prevents the escape of electrolyte beyond the stepped surface 80.

The above-described metallic ring arrangements provide improved insulating hermetic seals between the extending metallic terminal member 44 and the surrounding periphery of the terminal aperture 43, without the danger of elastomeric cold flow or the necessity of brazing. In addition, the above arrangements provide far superior resistance to radiation than the non-metallic bushing seals of prior designs.

In the foregoing, the invention has been described in conjunction with several illustrative embodiments. Since many variations and modifications of these embodiments will now become obvious to those skilled in the art, it is accordingly desired that the breadth of the claims not be limited to the specific disclosure herein contained.

1. In an electric battery cell operating with an alkaline electrolyte:
    a metallic casing having an apertured end wall;
    a pair of oppositely poled electrodes mounted within said casing and permeated by said electrolyte;
    a metallic terminal member conductively coupled to one of said electrodes, said terminal member having a seating head insulatingly engaging the said aperture end wall within said casing, said terminal member further having an elongated shank extending from said seating head through said aperture to the exterior of said cell;
    an insulating collar surrounding said shank intermediate the inner periphery of the aperture wall exterior of the casing;
    a first metallic sealing ring intermediate a first surface of said insulating collar and said shank;
    a second metallic sealing ring intermediate a second surface of said insulating collar and said aperture exterior wall;
    clamping means at the exterior end of said shank for inwardly urging said insulating collar towards said terminal head and thereby compressing said metallic sealing rings;

said first metallic sealing ring forming a first hermetic seal between said shank and insulating collar; and
said second metallic sealing ring forming a second hermetic seal between said insulating collar and aperture exterior wall.

2. In an electric battery cell having at least one pair of oppositely poled internal electrodes and permeated by an alkaline electrolyte;
a battery casing having at least one terminal aperture;
an elongated terminal member having a first end interior of said casing and electrically connected to one of said electrodes, an intermediate shank portion, and a second end extending outward of said casing aperture for connecting said one electrode to an external circuit;
a first metallic collar, the outer periphery of said first metallic collar in engagement with the inner periphery of said casing aperture, the inner periphery of said first metallic collar surrounding said terminal shank;
a first insulating collar between the interior end of said first metallic ring and said terminal member first end;
a second insulating collar adjacent the exterior end of said first insulating collar;
a second metallic collar intermediate the exterior end of said second insulative member and said second terminal end;
tightening means at said second end for urging said insulating collars and metallic collars into tight engagement;
a first metallic sealing ring clampingly held intermediate said terminal shank and said second insulative collar;
a second metallic sealing ring clampingly held intermediate said second insulative collar and said first metallic collar;
said tightening means compressing said metallic sealing rings to form hermetic seals, clamped by said second insulative collar against adjacent surfaces of said terminal shank and first metallic collar.

3. In a battery cell as defined in claim 2, said second insulating collar having first and second spaced surfaces, said first ring being compressed between said first surface and the adjacent surface of said shank, and said second ring being compressed between said second surface and the adjacent surface of said first metallic ring.

4. In a batery cell as defined in claim 1, each of said rings having a generally uniform, hollow cross-section defined by a closed periphery of predetermined geometrical shape.

5. In an electric battery cell, as set forth in claim 2:
said casing being metallic and said first metallic collar being conductively fused to the periphery of said casing aperture.

6. In an electric battery cell, as set forth in claim 2:
said metallic sealing rings having a generally uniform, hollow cross-section, defined by a closed periphery of predetermined geometrical shape.

7. In an electric battery cell, as set forth in claim 2:
said first and second insulating collars formed of a ceramic material.

8. An electric battery comprising:
a metallic casing enclosing an internal volume including at least one pair of oppositely poled electrodes and a cooperating liquid electrolyte;
at least one terminal member for connecting one of said electrodes to external circuitry, including an interior end, an external end and an intermediate shank portion;
said casing including a terminal aperture for receiving said terminal member;
said terminal aperture including an upstanding end wall including a portion interior of said casing and a portion exterior of said casing;
the interior end of said terminal member including a seating head of greater cross-sectional extent than said terminal aperture;
a sealing means for preventing the creepage of electrolyte outward of said casing in the region intermediate said terminal member and terminal aperture;
said sealing means including a first insulative collar intermediate said seating head and the interior portion of said aperture end wall;
the exterior portion of said aperture end wall including a seating recess;
a second insulative collar within said seating recess;
a first metallic sealing ring located between said terminal shank and a first surface of said second insulative collar;
a second metallic sealing ring located between the seating recess of said aperture end wall and a second surface of said insulative collar;
a tightening means at the exterior end of said terminal member for urging said insulative collar firmly into said seating recess and compressing said metallic sealing rings for forming a pair of hermetic seals clamped between metal surfaces separated by said second insulative collar.

9. An electric battery, as set forth in claim 8:
said tightening means including a threaded portion at the exterior end of said shank and a nut in engagement therewith;
a metallic collar intermediate said nut and said second insulative collar.

References Cited
UNITED STATES PATENTS

| 1,355,396 | 10/1920 | Hawkins | 136—168 |
| 1,372,603 | 3/1921 | Cook | 136—168 |
| 1,376,905 | 5/1921 | Sturges | 136—168 |
| 1,480,726 | 1/1924 | Jacquemin | 136—168 |

ALLEN B. CURTIS, *Primary Examiner.*

WINSTON A. DOUGLAS, *Examiner.*

C. F. LEFEVOUR, *Assistant Examiner.*